C. J. LUTHER.
PIPE UNION.
APPLICATION FILED AUG. 20, 1909.

974,504.  Patented Nov. 1, 1910.

WITNESSES
Geo. W. Naylor

INVENTOR
Charles J. Luther
BY
ATTORNEYS

THE NORRIS PETERS CO., WASHINGTON, D. C.

UNITED STATES PATENT OFFICE.

CHARLES J. LUTHER, OF ELIZABETH, NEW JERSEY, ASSIGNOR OF ONE-HALF TO JOSEPH C. DAVIS, OF MAPLEWOOD, NEW JERSEY.

PIPE-UNION.

974,504. Specification of Letters Patent. Patented Nov. 1, 1910.

Application filed August 20, 1909. Serial No. 513,803.

*To all whom it may concern:*

Be it known that I, CHARLES J. LUTHER, a citizen of the United States, and a resident of Elizabeth, in the county of Union and State of New Jersey, have invented a new and Improved Pipe-Union, of which the following is a full, clear, and exact description.

The invention is an improvement in unions or couplings for pipes and other conduits, and has for its object to provide a device of this character embodying two flanged coupling members having abutting interfitting portions forming a perfect fluid-tight joint, the opposed faces of the flanges having registering tapering recesses for the insertion of a wedge in separating one flange from the other.

Reference is to be had to the accompanying drawings forming a part of this specification, in which similar characters of reference indicate corresponding parts in all the views.

Figure 1:
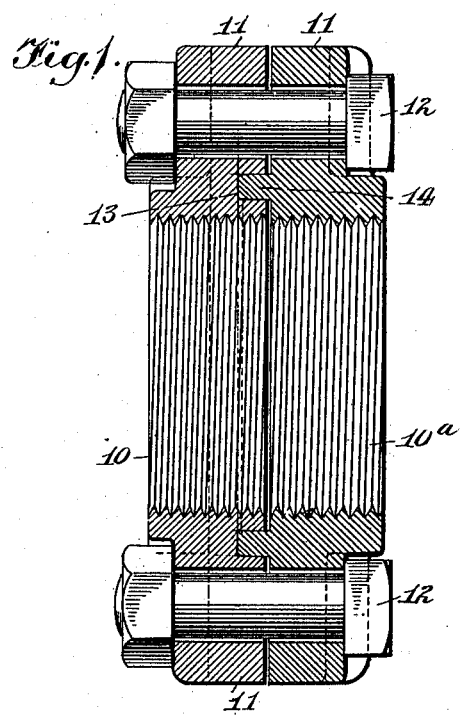
Figure 2:
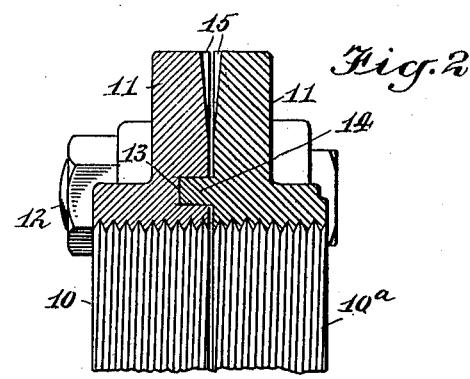
Figure 5:
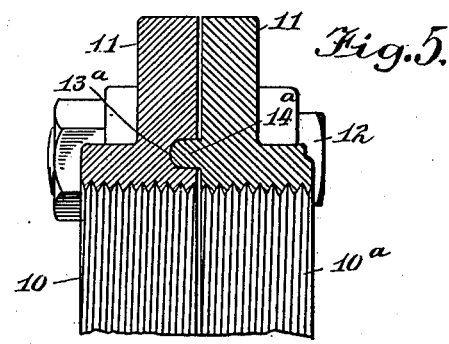
Figure 3:
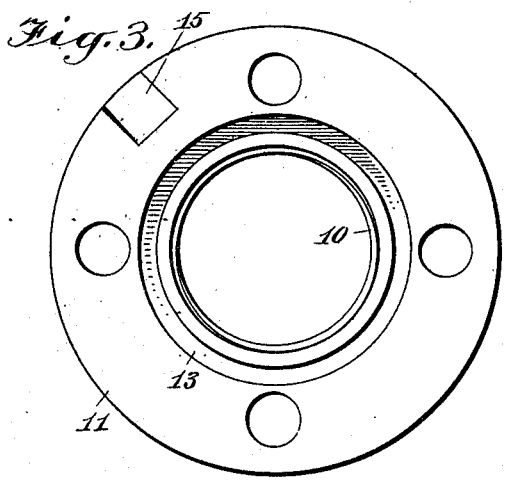
Figure 4:
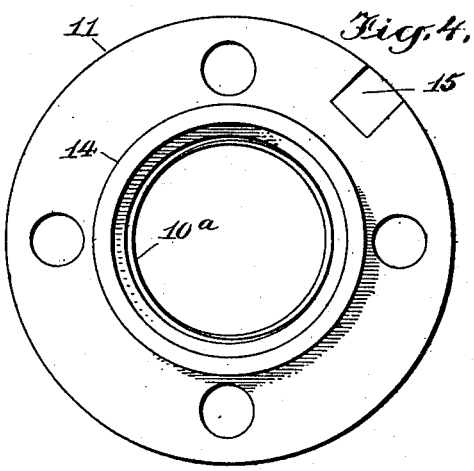

Figure 1 is a central longitudinal section of a flange pipe union embodying my invention; Fig. 2 is a like fragmentary section showing the wedge opening for forcing the two flanges apart; Fig. 3 is an inner face view of one of the pipe flanges; Fig. 4 is a like view of the other pipe flange; Fig. 5 is a sectional view similar to Fig. 2, showing a modified form of the joint.

Referring more especially to Figs. 1 to 4 inclusive, the pipe coupling or joint as shown therein embodies two tubular coupling members 10 and $10^a$ respectively, each having a flange 11 through which the two members are secured by a number of bolts or other equivalent devices 12. The abutting or opposed faces of the two members have interfitting parts forming a perfect fluid-tight joint between them, said parts constituting an annular groove 13 formed in the member 10 and an annular rib 14 adapted to snugly fit within the groove, both the rib and groove having opposite side faces arranged substantially parallel to the longitudinal axes of the respective members, with the rib of sufficient depth to bear on the bottom of the groove when the two flanges are bolted tight together, whereby three bearing faces are afforded on all radial sections of the joint. This I have found in practice to render the coupling leak-proof after constant usage under varying temperatures. I have shown the coupling members 10 and $10^a$ internally threaded to receive the two sections of the conduit or pipe to be joined, as is the conventional practice in couplings of this class. In order that the flange coupling members may be readily separated after the bolts are removed, the flanges 11 are provided with registering tapering recesses 15 for the insertion of a wedge.

In Fig. 5 I have shown a modified construction of my improvement as applied to the flange coupling members 10 and $10^a$. In this form of the invention the annular groove $13^a$ and the annular rib $14^a$, corresponding respectively to the groove 13 and rib 14 in that form of my invention just described, are respectively provided with a rounding bottom and a rounding point or edge, the rounding edge of the rib being adapted to bear on the bottom of the groove when the bolts 12 are tightened sufficiently to draw the two coupling members fully together. This construction of the joint adapts the coupling to be easily assembled. In either construction of the joint, between the opposed faces of the coupling members the joint is rendered fluid-tight at the instant the parallel sides of the rib enter the corresponding sides of the groove; however, for better security it is advisable to draw the coupling members fully together.

Having thus described my invention, I claim as new and desire to secure by Letters Patent:

The combination of two pipe flanges having opposed faces provided with interfitting members, the said opposed faces of the flanges having registering tapering recesses for the insertion of a wedge in separating one flange from the other.

In testimony whereof I have signed my name to this specification in the presence of two subscribing witnesses.

CHARLES J. LUTHER.

Witnesses:
W. W. HOLT,
JOSEPH C. DAVIS.